United States Patent
Ibar

(10) Patent No.: US 7,169,886 B2
(45) Date of Patent: Jan. 30, 2007

(54) PROCESS FOR THE CONTROL OF FLOW PROPERTIES OF POLYMERS

(76) Inventor: Jean Pierre Ibar, 58 N. Brandford Rd., Wallingford, CT (US) 06492

( * ) Notice: Subject to any disclaimer, the term of this patent is extended or adjusted under 35 U.S.C. 154(b) by 0 days.

(21) Appl. No.: 10/858,276

(22) Filed: Jun. 1, 2004

(65) Prior Publication Data

US 2005/0267289 A1    Dec. 1, 2005

(51) Int. Cl.
*C08F 6/00*  (2006.01)
(52) U.S. Cl. .................. 528/480; 73/54.14; 210/97
(58) Field of Classification Search ............. 73/54.14; 210/97; 528/480
See application file for complete search history.

(56) References Cited

U.S. PATENT DOCUMENTS 5,357,784 A * 10/1994 Collier ...................... 73/54.14

OTHER PUBLICATIONS

Article: The influence of microstructure on the dynamic mechanical behavior of polycarbonate/poly(styrene-co-acrylonitrile) blends. K. W. McLaughlin; Polymer Engineering and Science, vol. 29, Issue 22, pp. 1560-1568, (Nov. 1989).*

* cited by examiner

Primary Examiner—Terressa Boykin
(74) Attorney, Agent, or Firm—Laurence T Pearson

(57) ABSTRACT

A method for controlling the viscoelastic properties of a polymer comprising the steps of feeding a polymer melt into a first and optional subsequent means for applying a strain rate, each means for applying a strain rate being underfed or overfed according to the relative volumetric flow rates into the out of each means for applying a strain rate. The method further comprises subjecting the polymer melt in the means for applying a strain rate to a total shear rate that comprises contributions selected from the group consisting of pressure flow through an orifice, rotational flow about an axis that is parallel to the direction of flow of the melt, vibration in the transverse or longitudinal direction relative to the flow direction of the melt, and any combination thereof. The flow profile history that the polymer melt is subjected to is controlled by the choice of first, optional second and optional subsequent volumetric flow rates, the temperatures of processing in the first, optional second and optional subsequent means for applying a strain rate, and the shear rates exerted by the pressure flow, rotational flow and vibration in each or any of the first, optional second and optional further means for applying a strain rate. There are optionally intermediary zones in between the first means for applying a strain rate and the optional second means for applying a strain rate or the optional second means for applying a strain rate and the optional subsequent means for applying a strain rate or both, and the temperature in the optional intermediary zones are optionally used for control of the flow profile history of the melt.

19 Claims, 6 Drawing Sheets

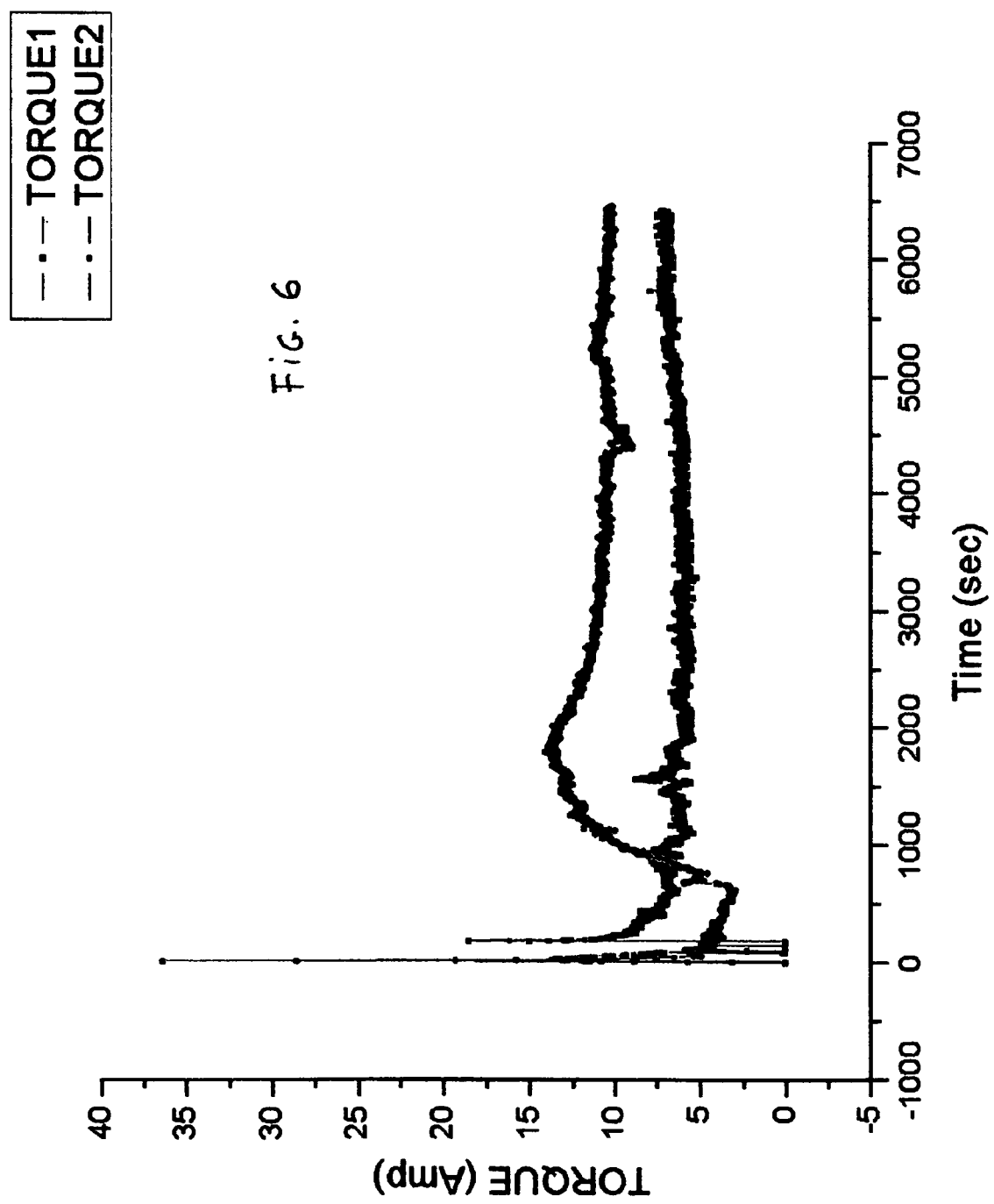

PROCESS FOR THE CONTROL OF FLOW PROPERTIES OF POLYMERS

BACKGROUND

The behavior of a polymer melt with respect to how it processes depends on its previous thermal history, and not just the stress that it sees at the beginning of or during a process. When the polymer melt is slowly deformed, its flow behavior is in the linear (i.e. Newtonian) viscoelastic range, and the Boltzmann superposition principle describes the memory function of the melt, from which the future viscoelastic response can be derived, in particular the melt's viscosity and elasticity. Industrial processing of polymeric melts preferably occurs at high throughput and involves higher strain rates. At strain rates that are sufficiently high, non linear effects such as shear thinning are observed for pseudo-plastic melts, and flow models exist which describe shear-thinning viscosity reduction quite well: a good example is the Carreau equation which calculates the viscosity of a polymeric melt at any temperature T and strain rate:

$$\eta(T, \dot{\gamma}) = \frac{\eta_o(T)}{\left(1 + \left(\frac{\eta_o \dot{\gamma}}{\tau_F}\right)^a\right)^{(n-1)/a}}$$

where $\eta$ is viscosity, $\eta_0$ the viscosity at low strain rate (Newtonian viscosity), and the other constants, a, $\tau_F$ and n, are characteristic parameters of the pseudo-plasticity of the melt, obtained by curve-fitting via non-linear regression experimental data of Log($\eta$) vs $\omega$ or $d\gamma/dt$. At high strain rate, the Carreau equation resumes to the simpler Power Law equation:

$$\eta = m(\dot{\gamma})^{n-1}$$

n is called the power law index, and m is the consistency index, which can be expressed as a function of n, $\eta_0$ and $\tau_F$. The power law index is 1 for Newtonian fluids and smaller than 1 for pseudo-plastic fluids, i.e. fluids for which viscosity decreases with strain rate, a phenomenon known as "shear-thinning"; this is the case for polymeric melts. Polymeric melts with lower power law index require less torque to shear, everything else being equal.

Shear thinning of plastic materials is known to processors and is used practically to lower the viscosity of melts during the filling stage of injection molding by increasing the speed of the injecting piston. This is particularly useful in the case of thin wall injection molding where considerable forces are required to fill the mold when the viscosity of the melt remains quasi-Newtonian. In summary, shear-thinning is well defined analytically and used practically.

More recently, rheologists have started to analyze the effect of strain rate of a melt submitted to elongational flow, and defined the elongational viscosity. The analogy with shear viscosity behavior covers many areas, in the linear viscoelastic range, including strain rate temperature superposition effects. However, a remarkable difference of behavior is observed at large strain rate, in the non linear viscoelastic range: strain hardening results from increasing the elongational strain rate. This means that the elongational viscosity of a melt subjected to fast extensional flow increases, in contrast to the shear-thinning response of a fastly shear-deformed melt, for which viscosity decreases.

an oscillation is imparted to the melt, leading to the knowledge of either the steady shear viscosity or the complex viscosity, $\eta^*$. It is well known to rheologists that plots of the complex viscosity, $\eta^*$, versus $\omega$, the angular frequency, are similar to plots of viscosity versus shear rate, the so-called Cox Merz's rule.

It is also known that shear thinning can be obtained, at a given temperature, by either increasing the shear rate or the frequency of oscillation of the melt at constant amplitude of oscillation. For example, the viscosity of PMMA at 239° C. can be reduced from 13,000 Pa-s to 2,000 Pa-s, i.e. by more than factor of 6, when the melt oscillates in shear at relatively low radial frequency, $\omega=100$ radians seconds$^{-1}$ (16 Hz).

Although it is known that the viscosity of a plastic melt can be reduced by shear thinning induced by vibration. In the linear viscosity range, at low strain amplitude, the viscosity reduction is instantaneous and only prevails under vibration, i.e. it ceases if the vibration ceases. In other words, the viscosity reduction induced by shear thinning is not preserved and the melt returns instantaneously to the Newtonian viscosity after the vibration ceases. Therefore, in the linear viscoelastic range, the viscosity reduction induced by vibration-shear thinning is required to be done while the material is injected or extruded, that is to say while the part is being shaped in a mold or a die. This implies the implementation of sophisticated vibration machinery added to traditional injection molding, blow molding or extrusion machines. Examples of such devices are described in other patents and applications (see for example; J. P. Ibar, U.S. Pat. No. 4,469,649 (1984), "Method and Apparatus For Transforming The Physical Characteristics of Material By Controlling The Influence of Rheological Parameters.", J. P. Ibar, EP Patent 0 273 830 B1 (1991), "Method and Plant For Fabricating A Product By Injecting Material Into A Mold With Treatment of Injected Material.", J. P. Ibar, U.S. patent application Ser. No. 07/882,754 (1990) "Method For Blow Molding Hollow Articles of a Synthetic Material" and U.S. Pat. Nos. 5,326,393 and 5,271,876, J. P. Ibar, U.S. Pat. No. 4,919,870 (1988), "Process of and Apparatus For Treating A Shaped Product", J. P. Ibar, U.S. patent application Ser. No. 07/880,926 (1993), "Molding Deformable Materials With Use of Vibrating Wall Surfaces" and U.S. Pat. No. 5,306, 129, J. P. Ibar, U.S. patent application Ser. No. 08/124,147 (1993), "Molding Apparatus and a Method of Using the Same", J. P. Ibar, U.S. patent application Ser. No. 08/138, 673 (1993), "Improved Injection Molding Process and Apparatus" and U.S. Pat. No. 5,494,426, J. P. Ibar, CA Patent 1,313,840 (1993) "Process and Device for Producing an Article by Injection of Material Into a Mold.", and J. P. Ibar, EP Patent 0 274 317 (1993), "Process and Device for Extruding a Product in the Form of a Film, Plate, Tube, Bar or Thread."). The same arguments can be said about the modification of the elasticity of a melt, which can be brought upon either by an increase of molecular weight or by melt vibration. The excess elasticity at a given temperature induced by the vibration condition ceases upon interruption of the vibration.

At larger strain amplitude of oscillation, in the non linear viscoelastic range, non linear effects induced by higher strain amplitude trigger a time dependence of rheological parameters and this effect is taken advantage of in U.S. Pat. Nos. 5,885,496 and 6,210,030 both to Ibar and both incorporated herein by reference in their entirety.

The present inventor has now discovered that it is possible to affect and control the rheological properties of a polymer melt by applying a longitudinal oscillation or vibration to the melt, in particular in a melt extensional situation. The values of the Carreau parameters and power law index can be adjusted thereby. The present invention is therefore a method to modify the value of at least one of the flow characteristic parameters, to render the melt, at will, either more pseudo-plastic, less pseudo-plastic, more viscous, more elastic, less viscous, less elastic, more strain hardening, less strain hardening, at least for a certain time. This method has utility for polymer processors who wish to control the processing characteristics or end use properties of the polymers without resorting to making changes in molecular structure of the polymer.

BRIEF DESCRIPTION OF THE INVENTION

The present invention is related to processes for the modification and optimization of polymer properties for processing, and in particular modification of properties by application of a processing history to a polymer melt, the processing history comprising steps where the melt is under shear-thinning/strain-hardening conditions caused by vibrational or non vibrational mode, longitudinal or rotational modes or a mixture of several modes or all modes, at a determined temperature, frequency and amplitude of oscillation, for a given residence time, while the melt is under flow volumetric constraint, followed by steps where the melt is in partial recovery, under other specific temperature and pressure conditions. Melt flow volumetric constraint should be understood as decompression and/or recompression depending whether it is an actual compression or a melt extension, caused for example by overfeeding or starve feeding a processor using a volumetric gear pump operating at a slower or faster volumetric flow rate than the discharge rate of the processor. Means to expand or shrink the melt as it flows under shear-thinning conditions, to create a leg for the thermal history, are also incorporated in this invention, an example of which would be forcing the melt to flow around conic surfaces, either from the small diameter to the larger one, resulting in melt extension, or its opposite. The incorporation of tilted ribs on the surface of moving surfaces, and the progressive increase or decrease of the degree of tilt as the melt progresses forward, also create melt extension or compression, which, combined with shear-thinning, and/or strain-hardening, builds up anther type of thermal history leg.

Accordingly, an objective of the invention is to provide a method for modifying the properties of a polymer melt by applying a history of shear and extensional flow in the form of vibration or longitudinal/rotational shear or both, and simultaneously constraining the volumetric flow feed of the melt to induce compressing or decompressing effects. The vibration can be brought to the melt by either the periodic motion of at least one surface touching the melt, or the forced passage of the melt through a bumpy gap presenting a succession of high and low gap areas, or a combination of both means.

By combining shear-thinning and/or strain hardening conditions with constrained flow, for a certain time, the present inventor has discovered that by imposing such shear thinning and/or strain hardening conditions in one device, and combining this thermal and processing history with that obtained in a subsequent, second device, the final polymer unexpectedly behaves rheologically differently under a given set of temperature, pressure and strain rate conditions, than it would without the prior imposition of shear thinning/ strain hardening conditions. In other words, the set of characteristic parameters: $\square_o$, a, $\square_F$ or n is modified by such a process, at least for a certain time, and in a way which depends on the precise thermal history in the non linear or linear domain. In particular, it was observed that the final melt rheological properties was a strong function of the strain rate vector, i.e. the orientation of the melt, during the shear-thinning/strain hardening steps under flow constraint building up the thermo-mechanical history. In other words, the relaxation times spectrum describing the final melt behavior, is modified by not only the intensity of shear-thinning/strain hardening under flow constraint, but also by the direction of flow while shear-thinning, i.e. by the vector addition of longitudinal and cross-rotational flow strain rates.

In one embodiment of the invention a thermo-mechanical history is created by passing the flow of a melt through a channel, at a given temperature and corresponding to an initial pressure drop, to create a gradient of volumetric flow between the entrance and the exit, so as to change the pressure drop profile between the entrance and the exit, and simultaneously apply longitudinal, rotational and/or oscillatory (longitudinal and rotational) means to induce shear-thinning/strain hardening, the amount of which relates to the change in pressure drop observed before and after applying the volumetric flow gradient.

In a further embodiment of the invention, the use of several stations allows the construction of an elaborate thermo-mechanical history with several stages, in order to modify the properties of the treated melt in a specific way.

In a still further embodiment of the process, a polymer melt is supplied to a first processor that applies longitudinal/ rotational or vibrational shear/extensional flow to the melt. An example of such a processor is described in U.S. Pat. No. 6,210,030 to Ibar which is incorporated herein in its entirety by reference. The melt is further processed by a second processor that applies a second condition of shear-thinning and/or strain-hardening deformation to the melt. The final processing history that is applied to the melt is further determined by the application of flow constraint to the melt in the first processor. Compression can be applied by overfeeding of the melt to the processor by ensuring that the volumetric rate of feeding into the processor is greater than the rate of feeding out. The final processing that is applied to the melt is also determined by the degree of starve feeding or overfeeding in the second processor. Compression can also be applied to the melt by feeding the melt through a cross section that reduces with flow distance.

Note that compression in a processor would not necessarily correspond to an increase of pressure, since the simultaneous action of any shear-thinning present would compensate for the effect of volumetric flow restriction. The overall effect of flow constraint under shear-thinning conditions can be seen as a modification of the pressure and flow rate profile from the entrance to the exit of the melt inside the processor. Optionally, the degree of over or underfeeding and of shear-thinning and/or strain-hardening in each processor is adjusted in order to maintain non steady state conditions overall. This results in a process for which pressures and torques are constantly fluctuating around mean values. In another embodiment of the present invention, the oscillations are forced and electronically regulated.

The polymer melt can then be optionally supplied to more processors in order to impart further processing history to the melt.

In another embodiment of this invention, the polymer melt is first submitted to an initial orientation treatment before being submitted to the thermal history of the present invention. Accordingly, the initial pellets fed in the present processing units, have already been processed, either by an identical set up as described in the present invention, albeit with a different set of thermal history parameters, or by a simpler processing unit, such as a single screw extruder, a twin-screw extruder, or any other equipment and apparatus known to people working in polymer melt processing capable of implementing known orientational effects in the pellets, before they are solidified. When the pre-thermal history implemented to the pellets before their submission to the present invention treatment also occurs in an apparatus of the same type as for the invention, we refer to the thermal history as "passes", $1^{st}$ pass, $2^{nd}$ pass etc. The difference for such a thermal history and a polymer melt going through several processors is the solidification stage of the pellets in between, which definitely implements a different kind of thermal history, especially for semi-crystalline polymers.

BRIEF DESCRIPTION OF THE FIGURES

FIG. 6 shows a graph of Torque versus Time for a treated and non-treated polymer melt.

DETAILED DESCRIPTION OF THE INVENTION

Definitions

The invention can be best understood by reference to the following definitions.

The terms "polymer" and "polymeric material" as used herein are synonymous, and are defined as in the Handbook of Chemistry and Physics, $84^{th}$ Edition CRC Press, 2003–2004, page 13–7 to 13–14, which pages are hereby incorporated herein by reference.

The term "polymeric melt" as used herein applies to polymers; or their blends, or to polymers incorporating some additives, including solvents, which can flow under the action of pressure flow or drag flow.

"Volume rate differential" (VRD) refers to the change in volumetric flow rate that takes place on going through a process. Mathematically it is given by;

$$-100*(V_{out}-V_{in})/V_{in}$$

Where $V_{out}$ is volumetric rate at the exit of the process, $V_{in}$ is volumetric rate at the entrance of the same station.

Starve feed refers to a condition in which the VRD is negative. For example a starve feed condition of 5% implies that the VRD=−5. Similarly overfeed by 5% means VRD=+5.

By "means for applying a strain rate" is meant a device that is capable of applying a strain rate to a polymer melt such that the shear and/or elongational viscosity of the melt become strain rate dependent. The device may also be operated in a regime in which the strain rate dependency does not appear.

EMBODIMENTS OF THE INVENTION

Figure 1:
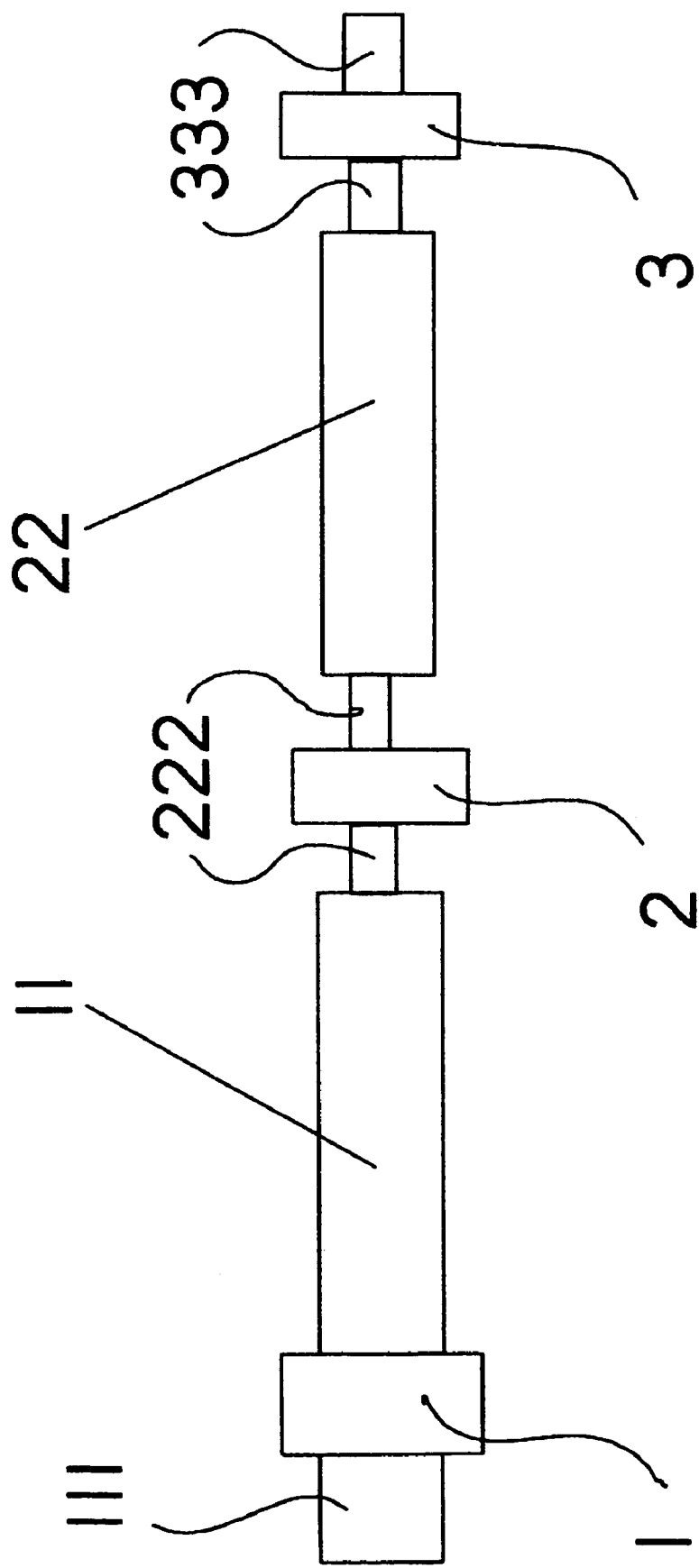
FIG. 1 shows a schematic diagram of one embodiment of the method of invention.

The present invention can be understood in reference to FIG. 1, which shows a schematic diagram of an embodiment of the process of the invention.

In FIG. 1, item 1 represents a melt feed mechanism. Examples of such mechanisms will be well known to one skilled in the art, but an example, not to be construed as limiting, would be a gear pump or other such device that feeds melt by a process of pushing melt at a volumetrically controlled rate. The melt is then supplied to a station (11) which is a means for applying a strain rate to the melt and in which the melt is subjected to vibrational or rotational shear.

In general in a station such as item 11, the state of shear that the melt is subjected to is defined by a gap through which the melt is forced to pass, defined herein by a width $h_{11}$. The gap width is optionally variable as a function of time and position in the station. The shear state of the melt is then a result of an interaction between the viscosity of the melt (and hence its temperature) and the rate and hence frequency at which the shear is applied to the melt.

Item 2 in FIG. 1 is then a melt feeder similar to item 10, which feeds the melt to a second station (22), which is a second means for applying to strain rate to the melt. A gap $h_{22}$ is associated with (22). From the second station (22) the melt then passes to a device (3) which controls the volumetric flow rate at the exit of (22), and may be a third melt feeder to another station down the line. Items (111), (222), and (333) represent intermediary zones in which the melt is transiting, between treatment stations, such as in item (222), or, see (111) and (333), before and/or after a volumetric controlling device, respectively (1) and (3). Item (333) may also be the transit zone to an equipment to pelletize and bag the polymer for storage and then use in subsequent processing operations. The intermediary zones' temperature and cross-sections, are designed and selected to impart a specific pressure and flow rate to the melt while it is in transit, thus in treatment recovery. Intermediary zones play an role in the build-up of the thermal history of the polymer melt.

The gaps defined by $h_{11}$ and $h_{22}$ may be rectilinear, in which case it is a slit, or circular, and formed by concentric cones or cylinders, or it may be a profile. The gaps may also be a combination of one or more slits, cones or cylinders. The calculation of shear rates for polymer melts through various slits is a known art and would be familiar to one skilled in the art.

The melt flowing through the gaps $h_{11}$ and $h_{22}$ with a given volumetric flow rate and at a given temperature would acquire a certain strain rate which would in turn define its viscosity according to the principles elucidated above.

If the rate at which the melt feed mechanisms (1) and (2) are not identical, there will be a state of either starve feeding or overfeeding in station (11). These states of starve or over feeding will result in a disturbance of the pressure profile the melt would have acquired at constant feed rate, and hence modify the viscoelastic state (which is pressure sensitive). This change in feed rates, coupled with shear-thinning and strain-hardening manifestations, that modify viscosity, then results in non-linear viscoelastic effects responsible for the synthesis of a flow profile history that influences the future viscoelastic state of the melt, in ways that will be exemplified in the examples given below.

In one embodiment of the invention, pressure in a station can be increased by over feeding the melt, but in turn can be effectively reduced by increasing the amount of shear that is applied to the melt. When the conditions of over feeding and shear-thinning are such that the melt has entered non-linear manifestations, the net results, according to this invention, are novel flow profile histories for the melt and therefore new characteristics of the melt passing through the station. Although the diagram in FIG. 1 shows one pair of stations, the invention may optionally comprise any number of stations greater than one, with melt pumps transferring melt between stations.

In further examples of embodiments of the invention, the existence of an overpressure in station 1 would result in an increase in melt elasticity in the product from station 2, and this increase in melt elasticity would be beneficial for use in processes such as blow molding, where melt strength is required but is normally acquired by means of higher polymer molecular weight, and hence higher operating pressures.

In a further specific example of an embodiment of the invention the polymer melt is starve fed by from 5% to 35% to station 1 and over fed by from 5% to 35% in station 2, with pressure in both station maintained below a certain defined level defined by the size of the gaps and the melt flow rate. In addition, shear-thinning conditions are met in both stations. However, shear-thinning in station 1 is set to only cause orientational effect, the melt staying there in the linear viscoelastic range, and the shear rate conditions applied to the polymer melt in station 2 have to compensate for the pressure increase caused by overfeeding by a reduction in melt viscosity, operated in the non-linear viscoelastic range, in order to cause a thermal history impacting the melt future behavior after it is pelletized.

In a further embodiment, the polymer melt is starve fed by from 5% to 35% to station 1 and over fed by from 5% to 35% in station 2 and the gaps in stations 1 and 2 optionally are similar, and the pressure in station 2 is optionally kept at one half or less of the pressure in station 1, the reduction in pressure being caused by the action of shear resulting in non-linear shear-thinning in station 2.

In a further embodiment of the invention, the degrees of over and starve feeding are not limited to from 5% to 35% but can be as much as can be compensated for by the shear thinning mechanism of the equipment being used.

In a still further embodiment of the invention, the flow history imparted to the melt combines flow characteristics that comprise over feeding in the first station combined with shear thinning to compensate for the pressure increase, combined with starve feeding conditions with shear thinning in the second station. The shear that is applied to the melt in the second station can be more than applied in the first station, hence or resulting in an increase in the effective total shear rate applied to the melt, or it can be less than what is applied in the first station.

In another embodiment of the present invention, the flow history imparted to the melt combines flow characteristics that comprise over feeding in the first station combined with shear thinning to compensate for the pressure increase, combined with further overfeeding conditions with shear thinning in the second station.

In a still further embodiment of the invention, the flow history imparted to the melt combines flow characteristics that comprise starve feeding in the first station combined with shear thinning to create a thermal history leg, combined with further starve feeding conditions with shear thinning in the second station.

Melt extension can also be created by flowing the melt through a gap of progressive expanded cross-section, such as in a diverging conical gap, and conversely, melt contraction results from flowing through a gap of progressive narrowing cross-section, such as in a converging conical gap. Ribs tilted on the surface of moving shafts in contact with the melt, can have progressive increase of tilting angle, as the melt moves over, and create an extensional effect. Like for shear, vibration associated with extensional flow can be caused directly, by oscillation of at least one surface in contact with the melt, or it can be the result of passing the melt through a series of "bumps" or ribs, placed along the flow path to locally squeeze and relax the melt periodically. The ribs can be aligned any direction relative to the direction of flow of the melt or relative to each other to produce the desired effect.

Constrained flow, extensional or restrictional, can be created by manipulation of the flow rate entering and exiting a defined gap section by means of gear pumps and other flow controlling devices positioned at the entrance and at the exit of the melt.

In still further embodiments of the invention, the shear and/or extensional flow conditions in the stations (11) and (22), resulting in shear-thinning and/or strain-hardening, can be differentiated into those created by the presence of the ribs, responsible for vibrational (longitudinal and rotational) motion in the longitudinal or cross directions, and those created by pure shear speed, either longitudinal or rotational (cross directional) motions, oscillatory or non-oscillatory. The proportion of vibrational and oscillatory strain rate in the total strain rate can vary from zero to 100% in either station.

In another embodiment of the present invention, the temperature is different in station 1 than in station 2. The difference in temperatures between the two stations can be any number that provides the desired result. A difference from 5 to 100° C. would be typical.

In still further embodiments of the invention, the temperature in the intermediary zones (222) is higher than in the treatment zone (11), and the same is true for (333) relative to (22). Yet, for another embodiment, the opposite is true, meaning that temperature of (222) is lower than temperature of (11), raising pressure in (11) by back pressure, and, similarly, temperature of (333) is lower than temperature of (22). In yet another embodiment, the situation is not identical for {(222) vs (11)} and ((333) vs (22)) temperature differences.

Although the configuration of the means for applying a strain rate shown in FIG. 1 shows two stations in series and operated on line, a further example of an embodiment of the invention would be to have one station only, and to cool and pelletize the melt from that station. The pellets can then be optionally remelted and fed to a subsequent or the same station. A still further example of an embodiment of the invention would be to have optional further means for applying a strain rate to the melt after the second means for applying a strain rate. Each means for applying a strain rate being operated with its own set of temperature, pressure shear rate and VRD parameters.

Figure 2:
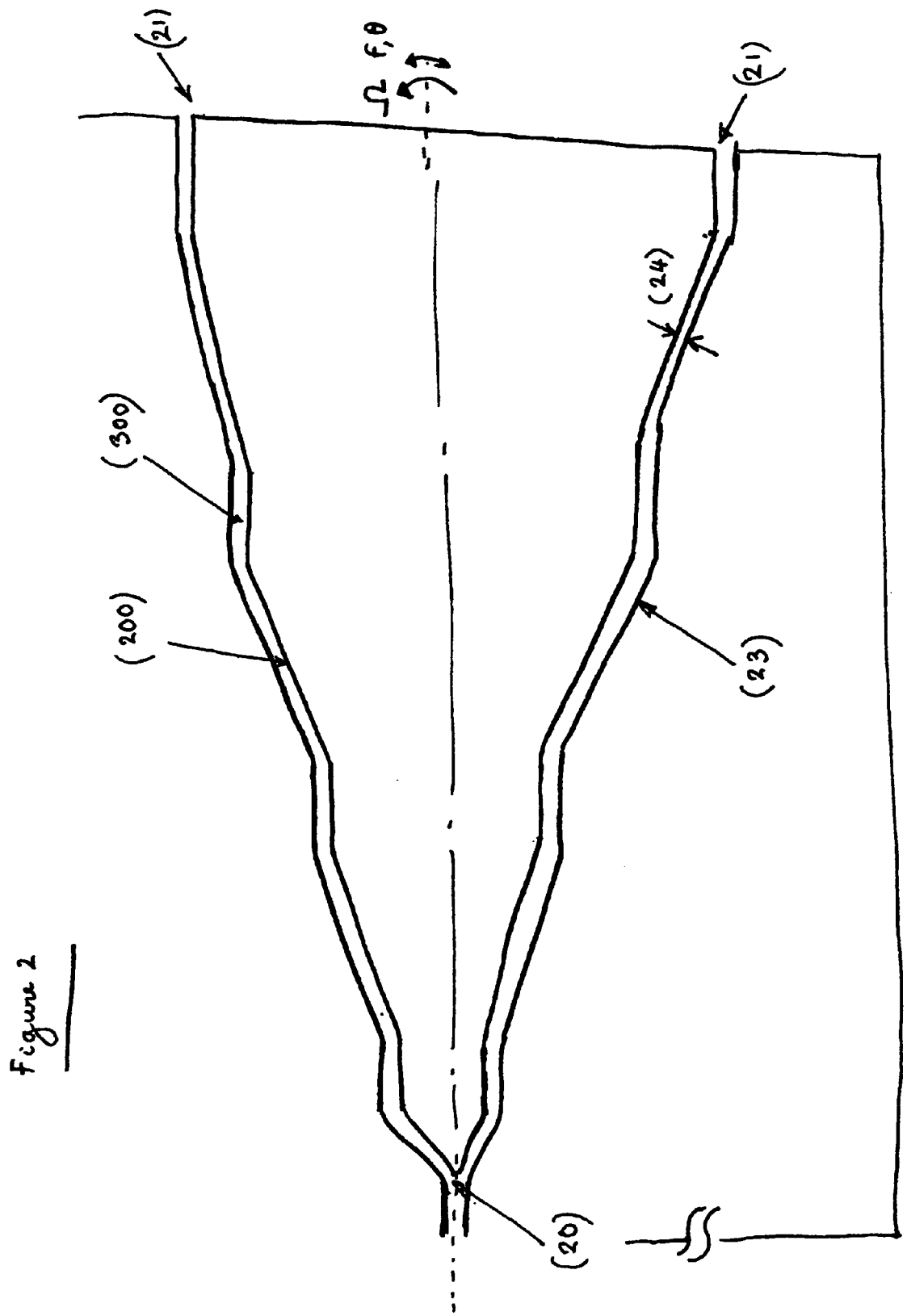
FIG. 2 shows a schematic diagram of an example of a gap configuration in a concentric conical/cylindrical arrangement in a processing station.

In FIG. 2 is shown a schematic illustration of an example of an apparatus that is a means for applying a strain rate to the melt that is suitable for implementing a processing station of the invention. The figure shows an inlet area (20) and an outlet area (21). The melt flows through successive regions of varying cross section (200), shown here as conical, and regions of constant cross-section (300), shown here as cylindrical. The variation in cross section provides a restriction or expansion to the melt, depending on which direction the melt flows. The variable cross section also has the option of being moved relative to the fixed wall (23) of the device, so that a further variation in shear can be applied to the melt. In the case of a conical cross section, the variable cross section takes the form of a rotor which is able to apply either a continuous rotational movement and/or a vibratory rotational movement to the melt. The cone angle in each section, the number of conical and cylindrical sections depends on the strain rate and shear rate history that one wants to impart to the melt.

The gap (24) shown in FIG. 2 may be fixed or variable along the length of the gap. It may also comprise ribs that are disposed either parallel with or perpendicular to the direction of flow of the melt. In another embodiment of the invention, the ribs are tilted at an angle which is either constant or variable along the direction of melt flow, creating another mean to extend or restrain the melt, depending on the increase or decrease of the angle.

It should be noted that although the channel shown in the device of FIG. 2 is conical and/or cylindrical with a circular cross section, any shape that presents a decreasing or increasing cross sectional area normal to the direction of flow of the melt is suitable for use in the present invention.

EXAMPLES

In the following examples, the melt flow index (MFI) of polycarbonate (PC) was measured at 300° C. under a weight of 1.2 kg. Molecular weight measurements were made using a Waters CV+ automated gel permeation chromatography apparatus (GPC, Waters, Milford, Mass.). Tetrahydrofuran (THF) was used a solvent with a refractive index detector.

Example 1

A virgin PC with MFI of 11.0 was subjected to the process of the invention under the following conditions.

Shear thinning was obtained with two Tek Flow processors (Stratek, Dublin, Ireland) run at temperatures of 275° C.

Volume rate differentials were 22.3% into the first processor and 4.7% into the second processor. Extension was induced in each processor by a concentric cone configuration at a rate of 26%/min in each processor. Gaps were 2.9 mm in the first processor and 2.8 mm in the second processor.

Shear thinning conditions in processor 1 were; rotation was induced in the cone at an angular velocity of 0.69 Hz Rotational vibration was induced in the melt at 15 Hz, with a longitudinal vibration frequency of 0.04 Hz.

In processor 2 a rotational oscillation of 18 Hz was used with a rotational rate of 0.60 Hz. Rotational vibration was induced in the melt at 13.3 Hz, with a longitudinal vibration of 0.04 Hz. Product from the second processor was cooled and pelletized.

The MFI of the product was 18.7. GPC confirmed a Mw degradation of no more than 1.3%.

Example 2

A PC sample with an initial MFI of 4.3 was subjected to the process of the invention using two Tek Flow processors. The volume rate differentials were −8.5% in the first processor and 0.0% in the second processor. Processing temperatures were 255° C. in both processors.

In processor 1 the melt extension rate was 90%/minute, with a processor gap of 2.62 mm. A longitudinal vibration was applied to the melt of 0.25 Hz frequency.

In processor 2 a gap of 2.57 mm was used and a longitudinal vibration was applied to the melt of 0.25 Hz frequency.

The resin from processor 2 was cooled and pelletized, and the final melt flow of the resin was 18.2 g/10 minutes. A Mw decrease of 20.4% was seen by GPC.

Example 3

Figure 3:
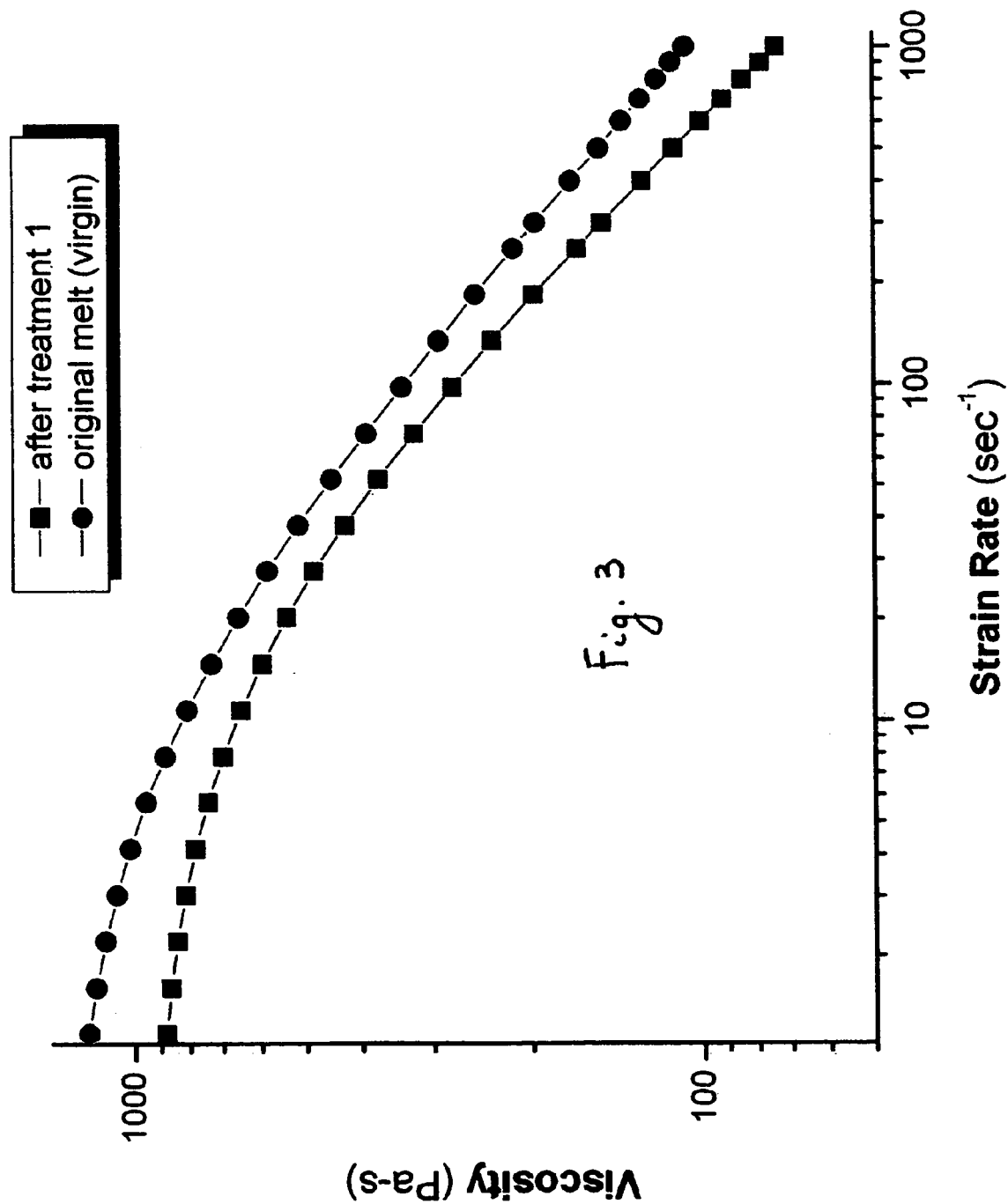
FIG. 3 shows a rheological graph of viscosity versus strain rate (or radial frequency) for a virgin and a treated sample by the invention.

Example 3 illustrates the ability of the invention to change the parameters of the Carreau equation relating to the melt of a polymer. FIG. 3 shows superimposed the curves of viscosity vs. shear rate for a virgin sample of linear low density polyethylene (LDPE) and samples that have been processed by the process of the invention. In the case of treatment L as compared to the virgin polymer, the rheology curves are essentially parallel. In the case of treatment I, the curves diverge with increase in shear rate. Table 1 summarizes the Carreau parameters for the samples, where $$\eta = \eta_0/(1+[\eta_0 \omega/T_F]^\alpha)$$

$$\lambda = \eta_0/T_F$$

and $$n = 1-\alpha$$

$n$=power law index as defined above.

TABLE 1

| Sample | $\eta_0$(Pa s) | $\lambda$ (s) | $\alpha$ | $T_F$ | n |
|---|---|---|---|---|---|
| Virgin | 5900 | 0.0146 | 0.9 | 404,109 | 0.1 |
| Treatment I | 5900 | 0.029 | 0.65 | 203,448 | 0.35 |
| Treatment L | 4300 | 0.028 | 0.65 | 153,571 | 0.35 |

In the above examples, treatment I results in a decrease of pseudo-plasticity and a decrease in $T_F$. Treatment L, in addition to the above, displays a decrease of the Newtonian viscosity.

Example 4

Figure 4:
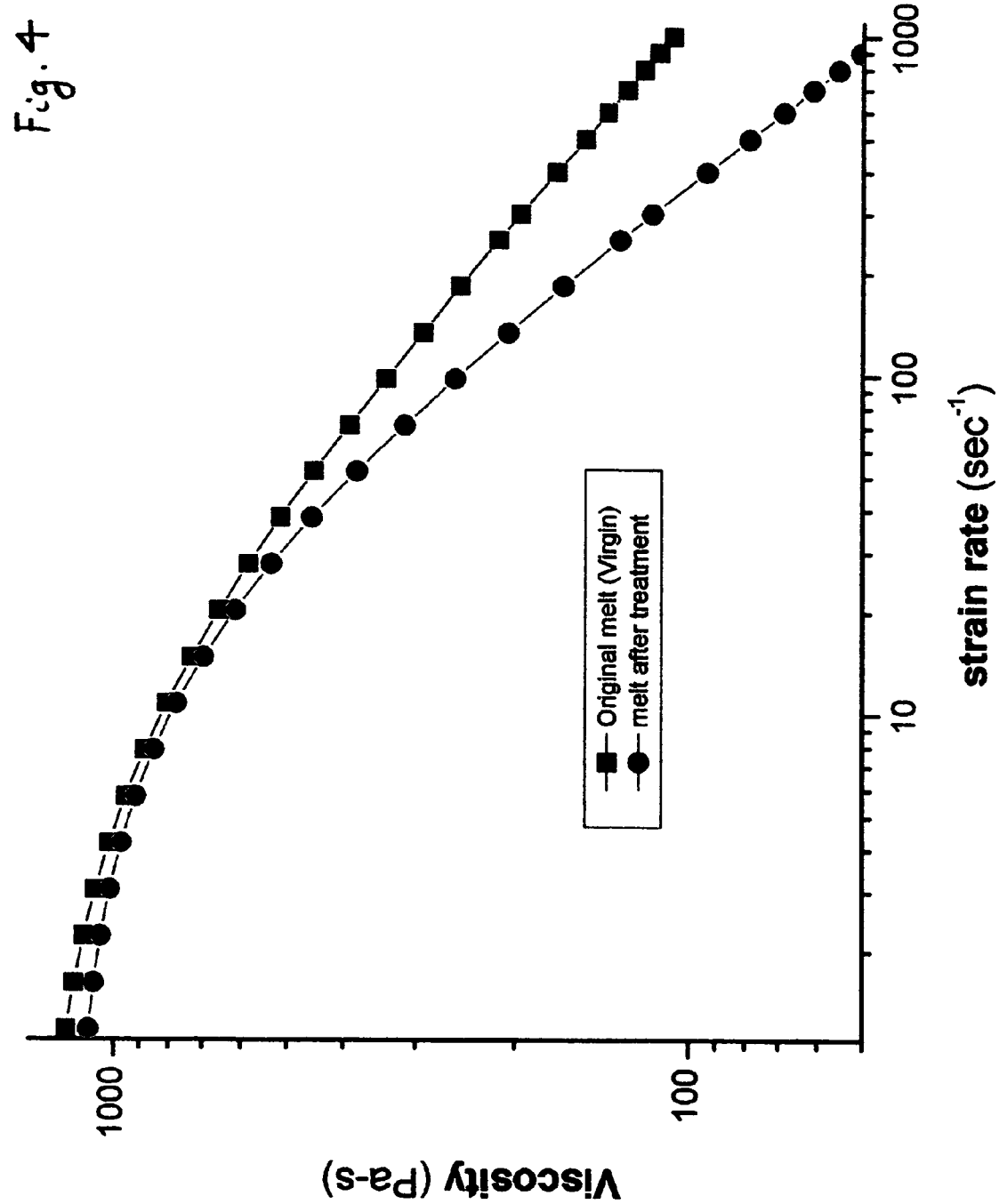
FIG. 4 shows a rheological graph of viscosity versus strain rate (or radial frequency) for a virgin and another treatment of the sample according to the invention.

FIGS. 3 and 4 show the effect of different thermal history on the rheological curves of a sample of polystyrene (PS) that has been treated by the process of the invention. The virgin PS had an initial viscosity of 1,350 Pa-s at T=220° C. The frequency sweep of the virgin PS is shown at the top of FIG. 3. The treated melt is below at all strain rates. The two curves are almost parallel.

Table 2 shows the Carreau parameters for these samples. In this case the fit is to the logarithmic Carreau equation:

$$\text{Log}(\eta)=\text{Log}(\eta_0)-A\text{Log}\{1+(B\omega)^C\}$$

| Sample | $\eta_0$ | A | B | C |
|---|---|---|---|---|
| Virgin | 1352 | 0.6174 | 0.1287(3) | 0.844(15) |
| Treated | 947 | 0.8525(9) | 0.0600(7) | 0.724(5) |

FIG. 4 also applies to the same PS polymer, but here the treatment by the process according to the invention is different. Specifically, temperature in the first processor is 50° C. lower than temperature in the 2nd processor, whereas the opposite was true for the treated sample of FIG. 3 (temperature of processor 2 was lower). Without presenting the Carreau's parameters for this case, it is clear from FIG. 4 that the new treatment provides a very different melt behavior, which demonstrates the versatility and power of the new invention. More specifically, it is shown that although the Newtonian viscosity is about the same for both the treated and the virgin samples, the viscosity of the treated sample becomes less than that of the virgin sample at higher strain rate. In summary, the treatment has increased the pseudo-plasticity of the melt. The industry would welcome such a behavior.

Example 5

Figure 5:
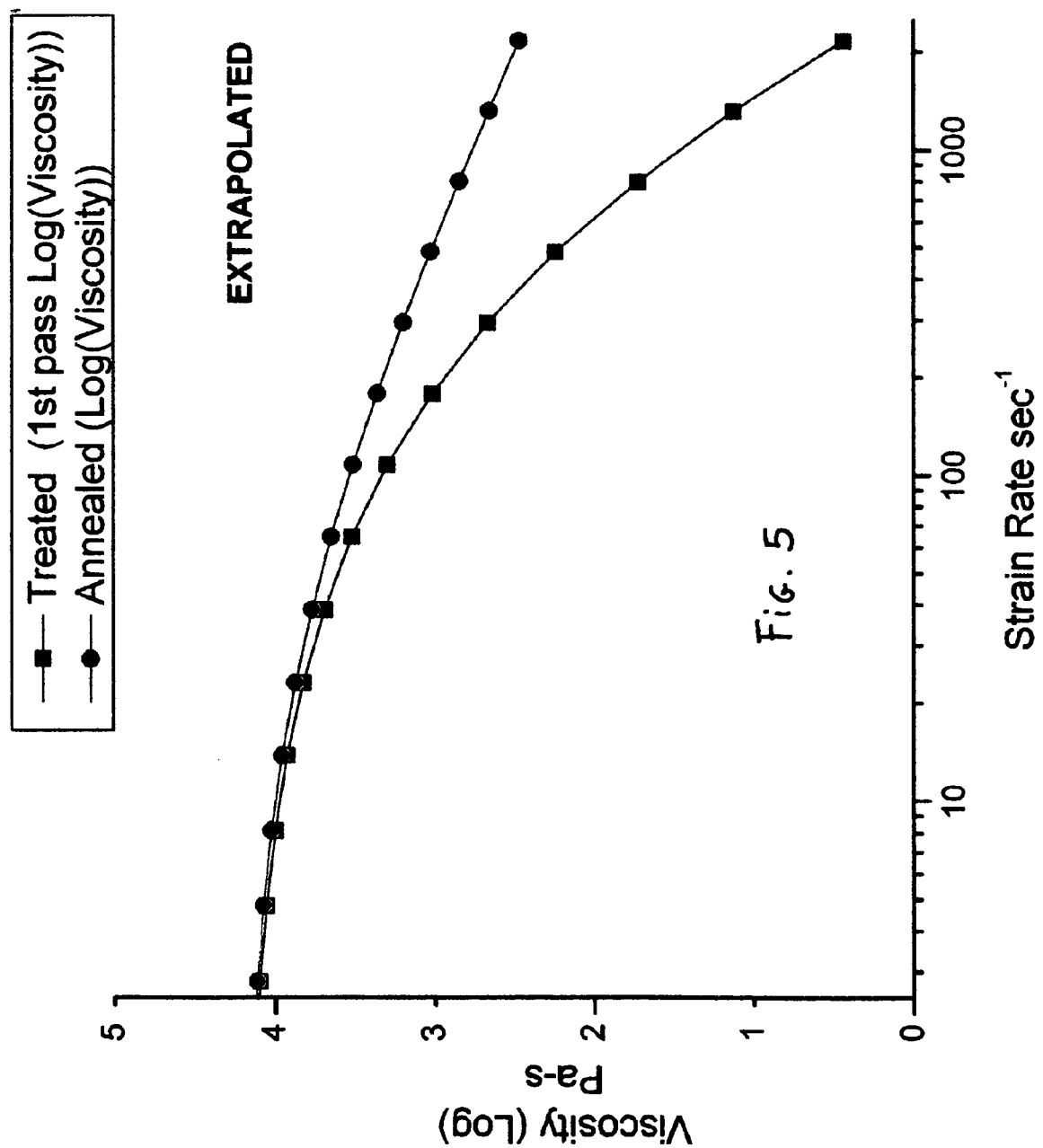
FIG. 5 shows a rheological graph of viscosity versus strain rate (or radial frequency) for a sample treated by the invention, before and after the sample is annealed at elevated temperature for a certain time.

FIG. 5 shows the effect of annealing on the rheological curves of a sample of polycarbonate (PC) that has been treated by the process of the invention. The PC had an initial virgin MFI of 4.3 grams/10 minutes. Annealing took place at 275° C. for 15 minutes.

Table 3 shows the Carreau parameters for these samples. Like in the previous example, the fit is to the logarithmic Carreau equation (standard deviation shown in parentheses.)

TABLE 3

| Sample | $\eta_0$ | A | B | C |
|---|---|---|---|---|
| Treated | $10^{4.2}$ | 9.18 (1.6) | 0.001 (0.00035) | 0.60 (0.009) |
| Annealed | $10^{4.2}$ | 1.36 (0.08) | 0.03 (0.003) | 0.69 (0.018) |

The effect of the process of the invention is clear from Table 3. The treated polymer has the same Newtonian viscosity than the annealed sample, but annealing restores the Carreau's parameters of the original untreated polymer. Note that the treated polymer is much more sensitive to shear rate than the annealed sample showing in this case an increase of pseudo-plasticity.

Example 6

FIG. 6 illustrates the relative stability of the melt viscosity improvements. This Figure plots Torque, measured by the current to rotate the melt at constant RPM, constant temperature, versus Time (sec). Such a measurement can be performed with a Torquemeter apparatus, for instance the ATR Plasti-Corder instrument by C.W. Brabender Instruments, Inc. (South Hackensack, N.J. USA). The rotation deforms the melt in the linear viscoelastic range. The polycarbonate melt represented by the red curve in FIG. 6, has been treated by the present invention, cooled, solidified, and then heated back to the molten region for the Torque test. The black curve represents the same test, at the same temperature, for a non-treated sample. FIG. 6 demonstrates that for as long as 10 minutes, the treated melt had a Torque value less than half the magnitude of the non-treated sample. However, a sharp increase of Torque is observed after 10 minutes in the Torque rheometer, resulting in a large overshoot of Torque with respect to the non-treated melt. This overshoot is followed by a slow return to the steady state value. It should be clear that the melt stability duration for the viscosity changes, resulting in the benefits according to the present invention, are modulated by the specific thermal history imparted by the treatment in the coupled processors.

While certain specific embodiments of the present invention have been disclosed in detail, it is to be understood that various modifications in its structure may be adapted without departing from the spirit of the invention or the scope of the claims annexed to and forming a part of this disclosure. In particular, one skilled in the art could, without undue experimentation, devise process conditions that produce a product of the required properties, and all such derivations of the process are to be considered to fall under the scope of the claims appended hereto.

I claim:

1. A method for controlling the viscoelastic properties of a polymer comprising the steps of;
   i. feeding a precursor polymer at a first volumetric flow rate as a melt into a first station that is a first means for applying a strain rate,
   ii. subjecting the polymer melt in the first station while the melt is under a compressional or elongational flow volumetric constraint to a total shear rate that comprises contributions selected from the group consisting of rotational flow about an axis that is parallel to the direction of flow of the melt, vibration in the transverse or longitudinal direction relative to the flow direction of the melt, and any combination thereof,
   iii. removing the melt from the first station at a second volumetric flow rate,
   iv. transferring the melt at the second volumetric flow rate into an optional second station that is a means for applying a strain rate,
   v. subjecting the polymer melt in the optional second station while the melt is under a compressional or elongational flow volumetric constraint to a total shear rate that comprises contributions selected from the group consisting of rotational flow about an axis that is parallel to the direction of flow of the melt, vibration in the transverse or longitudinal direction relative to the flow direction of the melt, and any combination thereof,
   vi. and transferring the melt optionally into one or more further optional stations that are means for applying a strain rate at further volumetric flow rates,
   vii. subjecting the polymer melt in each of the further optional stations while the melt is under a compressional or elongational flow volumetric constraint to a total shear rate that comprises contributions selected from the group consisting of rotational flow about an axis that is parallel to the direction of flow of the melt, vibration in the transverse or longitudinal direction relative to the flow direction of the melt, and any combination thereof,
   viii. cooling and solidifying the polymer melt into a solid in either a forming operation to produce a desired product or by forming pellets from the melt,
   in which the flow profile history that the polymer melt is subjected to is controlled by the choice of first, optional second and optional further volumetric flow rates, the temperatures of processing in the first, optional second and optional subsequent stations, and the shear rates exerted by the pressure flow, rotational flow and vibration in each or any of the first, optional second and optional further stations, and in which there are intermediary zones in between the first station and the optional second station and in between the optional second station and the optional further stations and in between any two of the further optional stations, and in which the temperatures in the optional intermediary zones are optionally used for additional control of the flow profile history of the melt, where the viscoelastic properties, Newtonian viscosity, pseudoplasticity, or any combination of these properties of a melt that would be obtained by remelting the solidified melt are changed from the properties of the precursor polymer.

2. The method of claim 1 in which the first, second, and further volumetric flow rates or some combination thereof are controlled such that any one or more of the first, second or further stations are independently overfed or underfed.

3. The method of claim 2 in which the first station is overfed with a VRD of between 5% and 35%.

4. The method of claim 1 in which one or more of the stations-comprises a channel through which the melt passes, said channel exhibiting a cross sectional area perpendicular to the direction of flow that changes in the direction of the flow and that is selected from the group consisting of a decreasing cross sectional area, an increasing cross sectional area, a constant cross sectional area and any combination thereof.

5. The method of claim 4 in which the channel comprises a cross section in the direction of polymer melt flow that is selected from the group consisting of conical, cylindrical, and any combination thereof.

6. The method of claim 1 in which the vibration in any of the stations is applied by a series of ribs embedded in one or both surfaces of the channel.

7. The method of claim 6 in which the ribs are aligned in a direction parallel to the direction of flow of the melt.

8. The method of claim 6 in which the ribs are aligned in a direction that is perpendicular to the direction of the flow of the melt.

9. The method of claim 1 in which the polymer melt from the first station is cooled and pelletized, and in which the pellets obtained thereby are reheated, melted and either receive a treatment in the second means for applying a strain rate or are treated a second time in the first station.

10. The method of claim 1 in which the temperature in the first station is either tower or higher than the temperature in the optional second station.

11. The method of claim 10 in which the absolute value of the temperature difference between the first station and the optional second station is at least 5° C.

12. The method of claim 1 in which the temperature in any of the first, optional second, or optional subsequent stations is not constant along the melt pathway through the means for applying a strain rate.

13. The method of claim 12 in which the temperature in any of the first, optional second or optional subsequent stations increases linearly with distance through the station.

14. The method of claim 12 in which the temperature in any of the first, optional second or optional subsequent stations decreases linearly with distance through the station.

15. The method of claim 1 in which the first station is operated with the melt in its linear viscoelastic range.

16. The method of claim 1 in which any of the first, optional second or optional further stations is operated with a positive VRD and the total shear rate in any of the first, optional second or optional further stations is such that the pressure drop across the the first, optional second or optional further stations-is less than 10% higher than if the VRD were zero.

17. The method of claim 1 in which the total shear rate in any of the first, optional second or optional further stations varies with time.

18. The method of claim 1 in which the flow history imparted to the polymer melt comprises starve feeding in the first station and starve feeding in the optional second station.

19. The method of claim 1 in which the flow history imparted to the polymer melt comprises overfeeding in the first station and overfeeding in the optional second station.

* * * * *